US011976784B2

(12) United States Patent
Gouldrup

(10) Patent No.: US 11,976,784 B2
(45) Date of Patent: May 7, 2024

(54) CEILING MOUNTED ELECTRONIC DEVICE HOLDER

(71) Applicant: Brian Gouldrup, North Easton,, MA (US)

(72) Inventor: Brian Gouldrup, North Easton,, MA (US)

( * ) Notice: Subject to any disclaimer, the term of this patent is extended or adjusted under 35 U.S.C. 154(b) by 0 days.

(21) Appl. No.: 17/931,550

(22) Filed: Sep. 13, 2022

(65) Prior Publication Data

US 2024/0084965 A1 Mar. 14, 2024

(51) Int. Cl.
*F16M 13/02* (2006.01)
*B66D 1/46* (2006.01)

(52) U.S. Cl.
CPC ............ *F16M 13/027* (2013.01); *B66D 1/46* (2013.01)

(58) Field of Classification Search
CPC ................................ F16M 13/027; B66D 1/46
USPC ................ 248/317, 320, 327, 328, 329, 332
See application file for complete search history.

(56) References Cited

U.S. PATENT DOCUMENTS

| 2,391,936 | A | * | 1/1946 | Wilson | F21V 21/38 |
| | | | | | 248/320 |
| 2,953,969 | A | * | 9/1960 | Pepple | G09F 19/18 |
| | | | | | 414/626 |
| 3,469,814 | A | * | 9/1969 | Carlson | A47G 1/24 |
| | | | | | 359/873 |
| 4,872,632 | A | * | 10/1989 | Johnson | A47F 5/0892 |
| | | | | | 254/391 |
| 5,361,565 | A | * | 11/1994 | Bayer | B66C 13/26 |
| | | | | | 254/273 |
| 7,575,098 | B2 | * | 8/2009 | Hartley | B66B 9/00 |
| | | | | | 248/330.1 |
| 2017/0053569 | A1 | * | 2/2017 | Votolato | F16M 13/027 |

FOREIGN PATENT DOCUMENTS

| DE | 3323138 C2 | * | 1/1985 |
| DE | 202014004031 U1 | * | 7/2014 |
| DE | 102018133616 A1 | * | 7/2020 |
| EP | 1045191 A1 | * | 10/2000 |
| EP | 2123196 A1 | * | 11/2009 |
| WO | WO-2019084598 A1 | * | 5/2019 |

\* cited by examiner

*Primary Examiner* — Kimberly T Wood
(74) *Attorney, Agent, or Firm* — Savantek Patent Services; Ivan E. Rozek

(57) ABSTRACT

A ceiling mounted electronics device holder that allows a platform to raise or lower via cables to any desired height to allow a person sitting or lying on a bed to have easy access to an electronics device mounted to the platform when so needed, and to cause the platform to raise, via handheld transmitter, into a hollow housing mounted on the ceiling when not in use. The cables are rolled up or down on motorized pulleys located within the hollow housing. Rotary electrical connectors allow the cables to carry electrical current from a charging port located on the side of the platform to the rechargeable battery stored in the hollow housing.

5 Claims, 10 Drawing Sheets

CEILING MOUNTED ELECTRONIC DEVICE HOLDER

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of portable personal electronic device holding apparatus and more specifically to a ceiling mounted electronic device holder that that attaches to the ceiling of a room.

Electronic device holders are well known. There are many table-supported and vehicle-mounted devices for sale today that are designed to hold a variety of electronic devices such as tablets and smart phones. Frequently, the holding devices allow the user to adjust the position of the device to a custom height or angle.

However, there are some instances where a user would like to use or watch a portable electronic device while in a prone or sitting position while in bed or other similar situations. Several electronic holding devices have been marketed recently that are designed to be positioned on the floor or table next to a bed, to allow the user to use an electronic device while in bed, but they tend to be in the way when not in use.

There is therefore a need for a method of holding an electronic device in close proximity to a bed that can be easily and quickly removed from the useful area of the bed and can be just as easily and quickly be replaced into a use position for a person to use while sitting or lying on a bed.

BRIEF SUMMARY OF THE INSTANT INVENTION

An object of the invention is to provide a ceiling mounted electronic device holder that allows an electronic device to be stored in a housing located on the ceiling of a bedroom or other indoor room and where the device holding platform can be remotely activated to raise or lower a platform from the housing and capable of holding a portable electronic device.

Another object of the invention is to provide a ceiling mounted electronic device holder that allows the user to tilt the lowered holding platform at a variety of angles.

Another object of the invention is to provide a ceiling mounted electronic device holder that allows the user to recharge the battery of the holder device when the holding platform is in the down position where it is easy to access a charging port.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a ceiling mounted electronic device holder having a main housing that mounts to the ceiling and stores a horizontally disposed platform that is capable of being raised and lowered via a plurality of cables that are stored on rollers that are battery powered by two DC gear motors within the main housing, where the two of the cables act as electricity carrying members allowing a battery charging port to be mounted on the platform which can be lowered for easy battery recharging.

BRIEF DESCRIPTION OF THE DRAWINGS

The drawings constitute a part of this specification and include exemplary embodiments to the instant invention, which may be embodied in various forms. It is to be understood that in some instances various aspects of the instant embodiments may be shown exaggerated or enlarged to facilitate an understanding of the instant embodiment.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
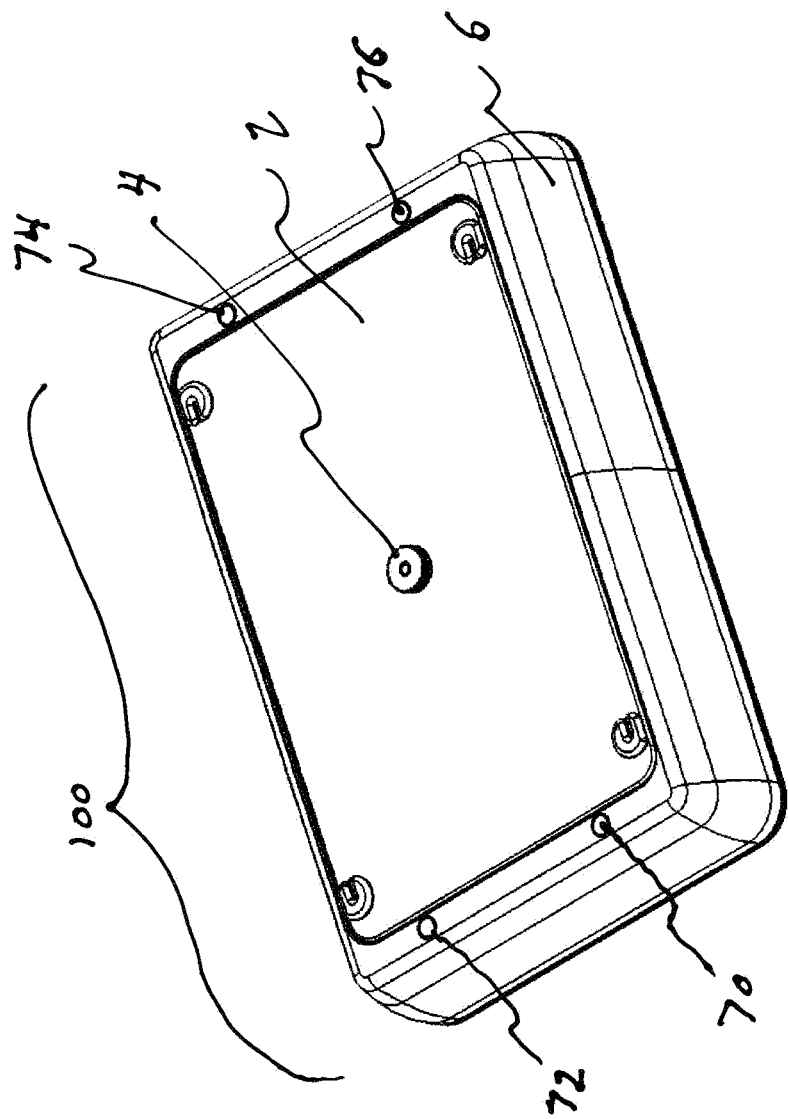
FIG. 1 is a perspective view of the invention as it would be seen looking up at a ceiling where the embodiment is mounted.

Referring now to FIG. 1 we see a perspective view of the embodiment 100. The embodiment 100 is being viewed from the underside as it is mounted to the ceiling of a room such as a bedroom, above a bed. The main housing 6 holds electro-mechanical elements as will be discussed below and is covered by a platform member 2 that can be raised or lowered as will be explained below. Screw covers 70, 72, 74, 76 conceal anchor screws that hold the main housing to the ceiling. Nut 4 holds an adjustable electronic device holder in place on the opposite side of panel 2.

Figure 2:
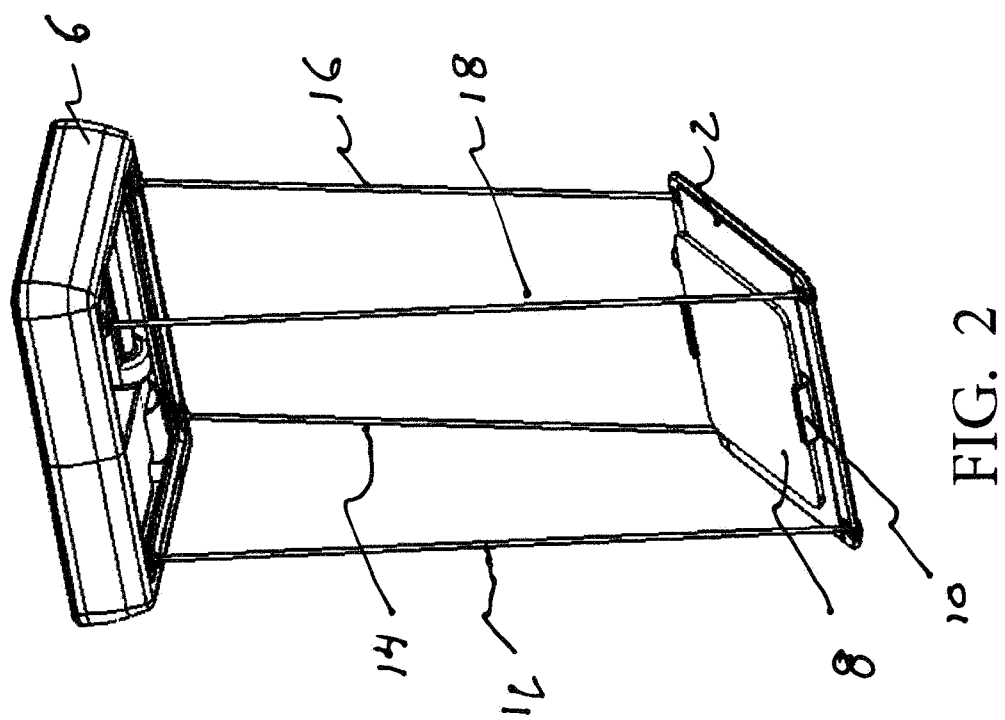
FIG. 2 is a perspective view with the platform lowered to a use position.

FIG. 2 is a perspective view of the embodiment hanging from a ceiling and showing a platform 2 lowered from the main housing 6 via cables 12, 14, 16, 18. An adjustable device holding mechanism 10 can be expanded or contracted via a spring mechanism to hold electronic devices of various sizes. This type of device holding mechanism is known and commonly used in a variety of device holding products. The rear two cables 14, 16 can be independently adjusted by the user, using a remote handheld device to cause the device 8 such as a tablet to be tilted at an angle for easy viewing.

Figure 3:
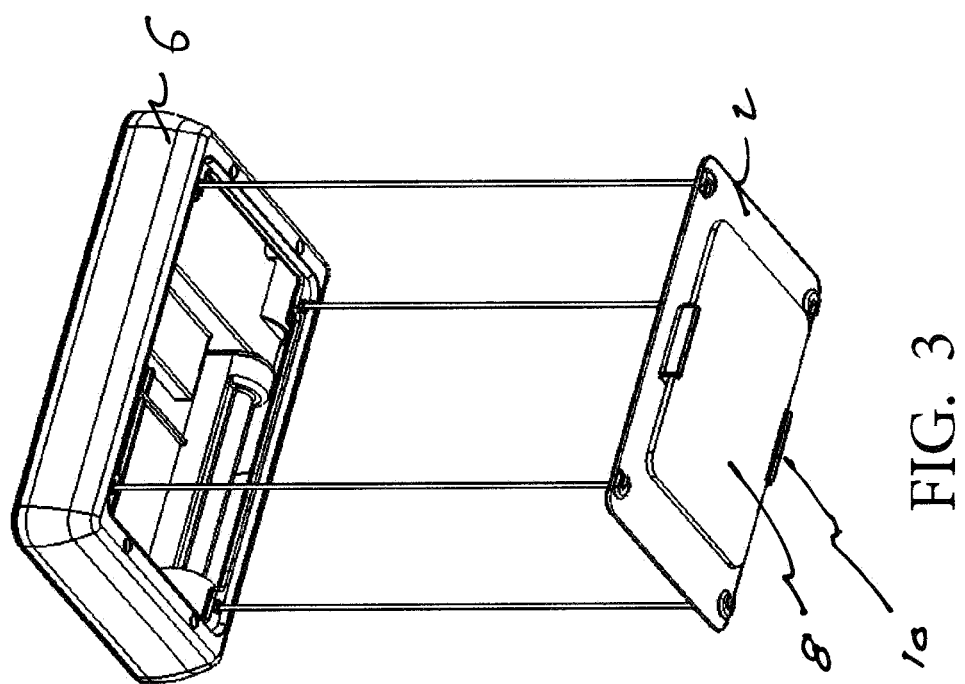
FIG. 3 is a perspective view of the embodiment showing a tablet retained on the outer surface of the platform.

FIG. 3 shows a similar view as shown in FIG. 2 however the device holding assembly 10 has been fastened to the underside of platform 2 allowing the electronic device 8 to be suspended directly above a person's head while the person is lying in a prone position in bed.

Figure 4:
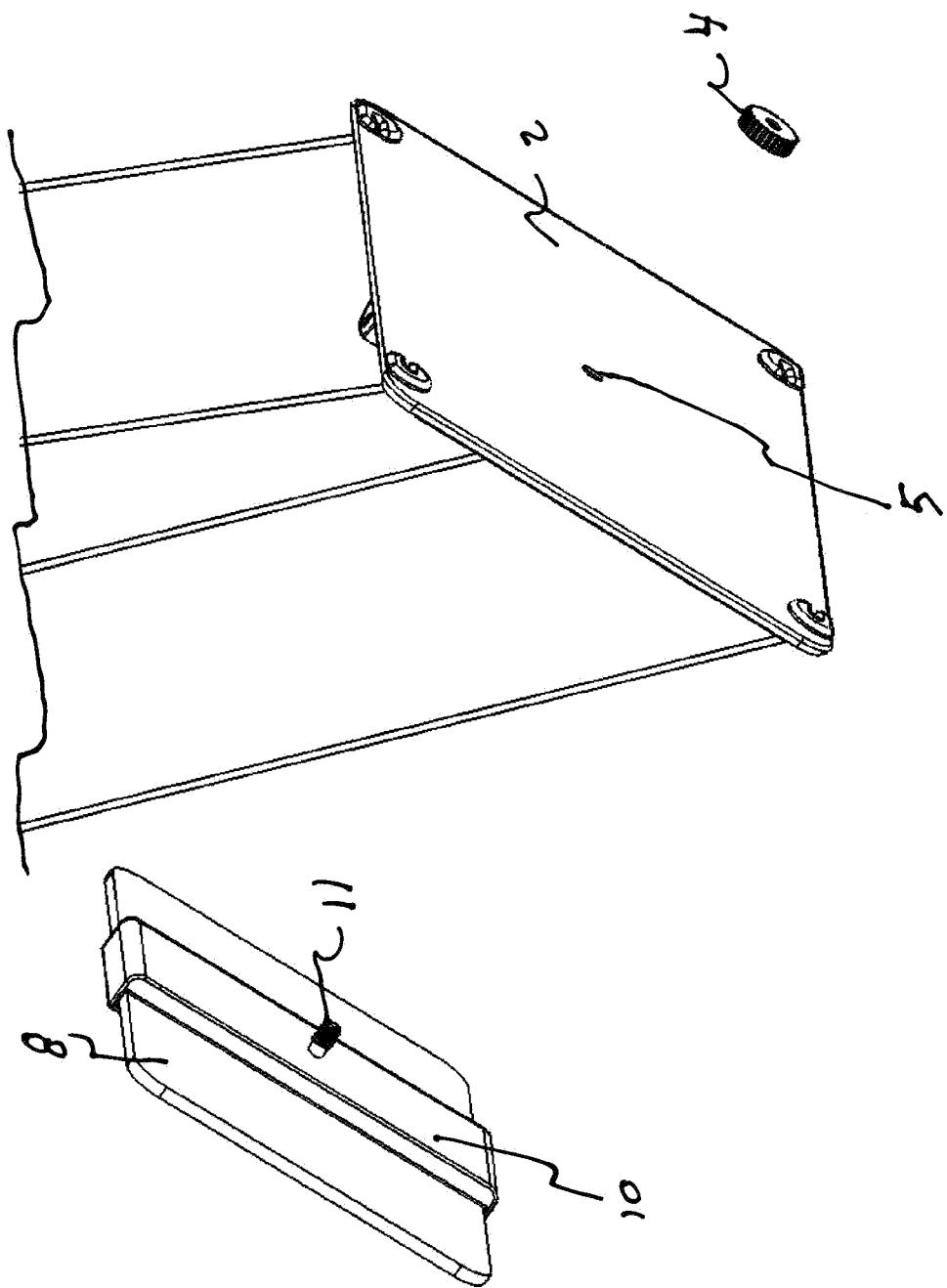
FIG. 4 is a partial perspective view of the electronic device holder about to be bolted onto the platform.

FIG. 4 is a partial exploded view showing the device holder assembly 10 holding an electronic device 8 and about to be installed on platform 2 by having threaded post 11 penetrate aperture 5 and secured by nut 4. The electronic holding device 10 can be attached to the top surface of panel 2 or the bottom surface of platform 2 depending on how the user intends to use the invention 100.

Figure 5:
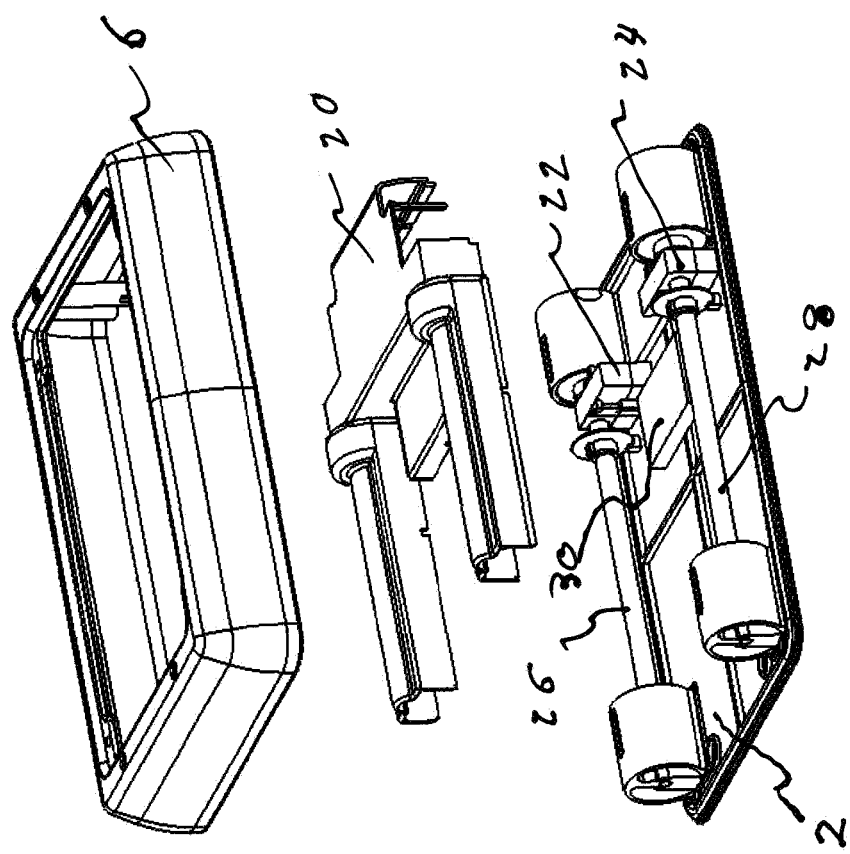
FIG. 5 is an exploded view of the embodiment.

FIG. 5 is an exploded view of the embodiment showing main housing 6, cosmetic cover 20, gear motors 22, 24, shafts 26, 28, platform 2, and other components used in the embodiment 100 which will be described in detail in the following FIGS. 6, 7, 8, 9.

Figure 6:
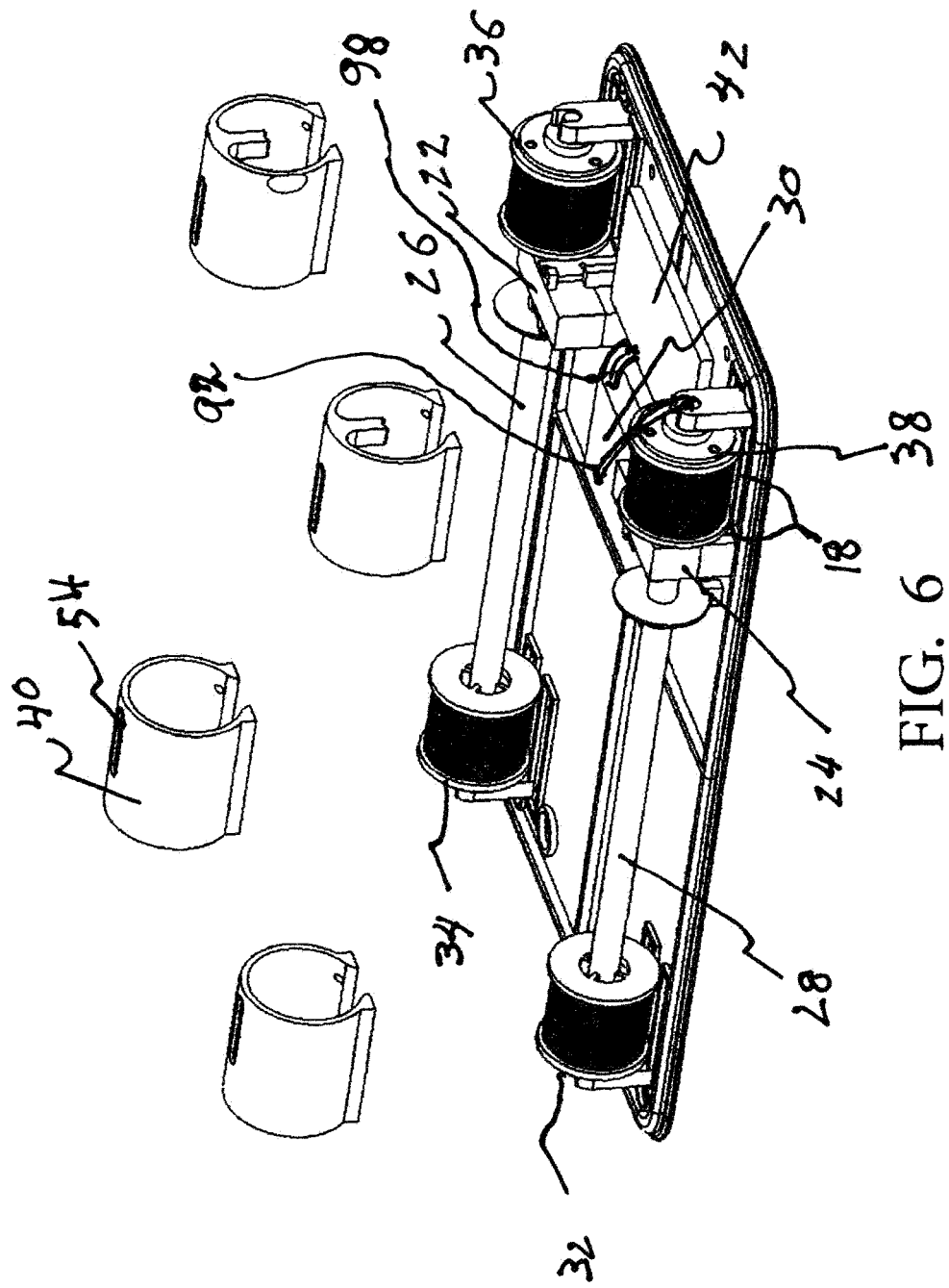
FIG. 6 is a perspective view of the internal components with the pully covers removed.

FIG. 6 is a perspective view of the working components of the embodiment with main housing 6 removed and pully covers 40 lifted off to reveal pulleys 32, 34, 36, 38 which each contain rolled cables 12, 14, 16, 18 as shown in FIG. 2. Pulley covers 40 keep the cables from jumping off the pulleys during use. The cables exit through slits 54 in pulley covers 40. Gear motors 22, 24 each have double shafts which extend from either side of the gear motor 24, 22. The right-side shaft of gear motor 24 causes the right-side pulley 38 to rotate and the left side shaft of gear motor 24 causes extended shaft 28 and attached pulley 32 to rotate. Therefore, both pulleys 32, 38 turn at the same rate and cause the cables 16, 18 to extend or retract at the same rate. The same holds true for pulleys 34, 36 which are driven by gear motor 22. It should be noted that in one embodiment, only three cables can be used, two in the front of platform 2 and one centrally located in the back of platform 2. Cable 98 connects the power supply 30 with electronic assembly 42. Cable 92 connects cable 18 to electrical assembly 42. Additional cables extend from each rolled up cable assembly 32, 34, 36, but are not shown for clarity purposes.

Figure 7:
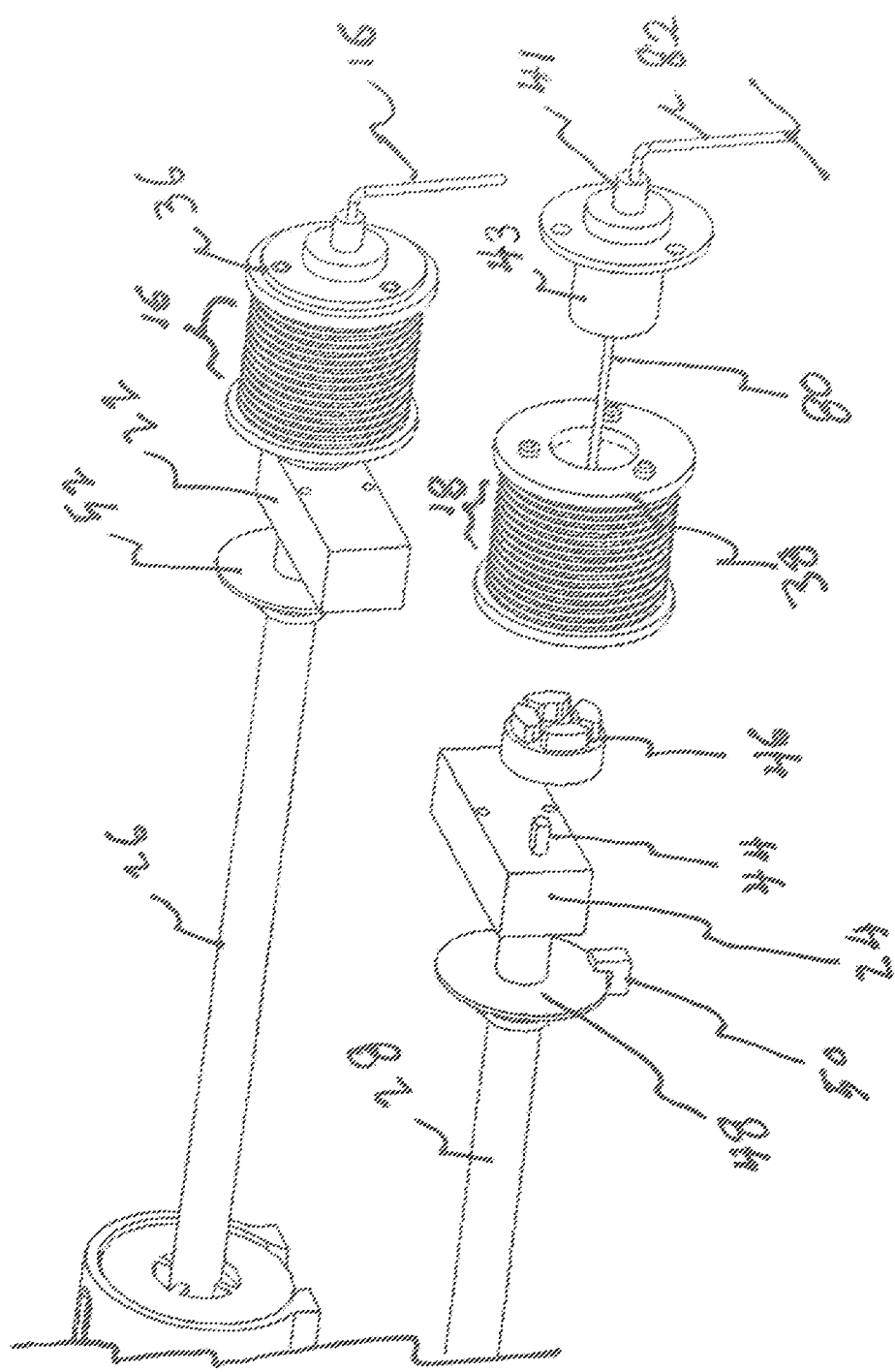
FIG. 7 is an exploded view of roller and rotary electrical connection about to be installed onto a gear motor.

FIG. 7 is an exploded view of the mechanical drive components of the embodiment 100. Gear motor 24 has a right-side shaft 44 which engages connector piece 46. The opposite side of connector 46 engages pulley 38. The right side of pulley 38 comprises means for delivering electric power to the device holding platform, is hollow and can accept rotary electrical connector 43 which terminates on its right side in stationary shaft 41. The rotary connector 43 allows one electrical cable 80 to be connected to cable 18 which is rolled up on pulley 38 and the other electrical cable 82 to go to battery power supply 30 shown in FIG. 9. Encoder disk 48 is attached to shaft 28. As magnet on the encoder disk 48 passes by sensor 50, it registers as one revolution in a microprocessor within electrical assembly 42 shown in FIG. 9. In this way, the amount of cable unspooled or spooled onto the pulley 38 can be monitored and used to remember the preferred amount of drop of platform 2.

Figure 8:
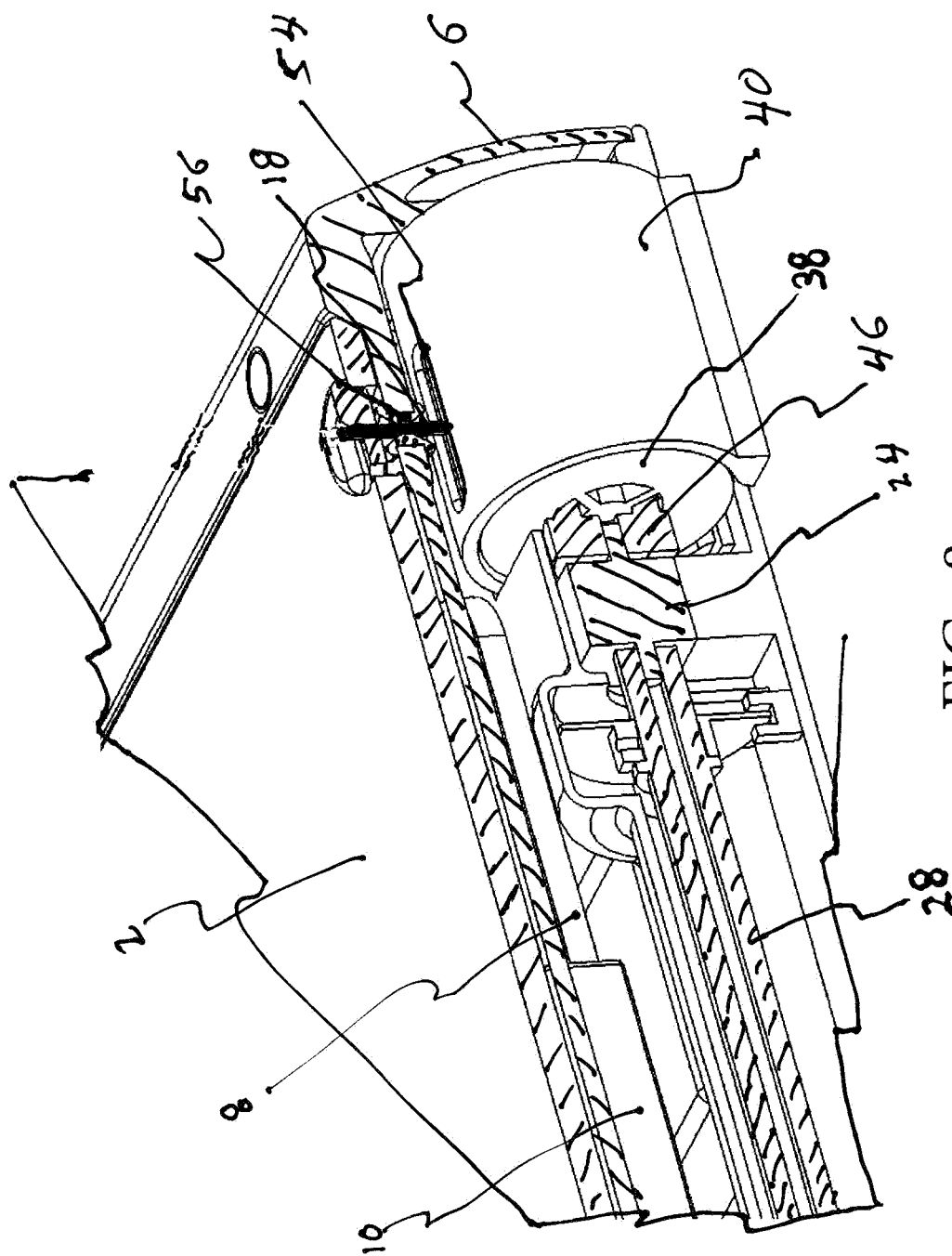
FIG. 8 is a partial section view of the drive components of the embodiment.

FIG. 8 is a partial section view of the embodiment 100. Panel 2 is supported by four cables 12, 14, 16, 18 one of which 18 is shown in this section view. Gear motor shows its double shaft configuration, one side of which rotates pulley 38 and the other side of which rotates shaft 28. Rubber eyelet 56 creates a slight frictional force to ensure that the cable 18 remains taught as it is being rolled up on pulley 38.

Figure 9:
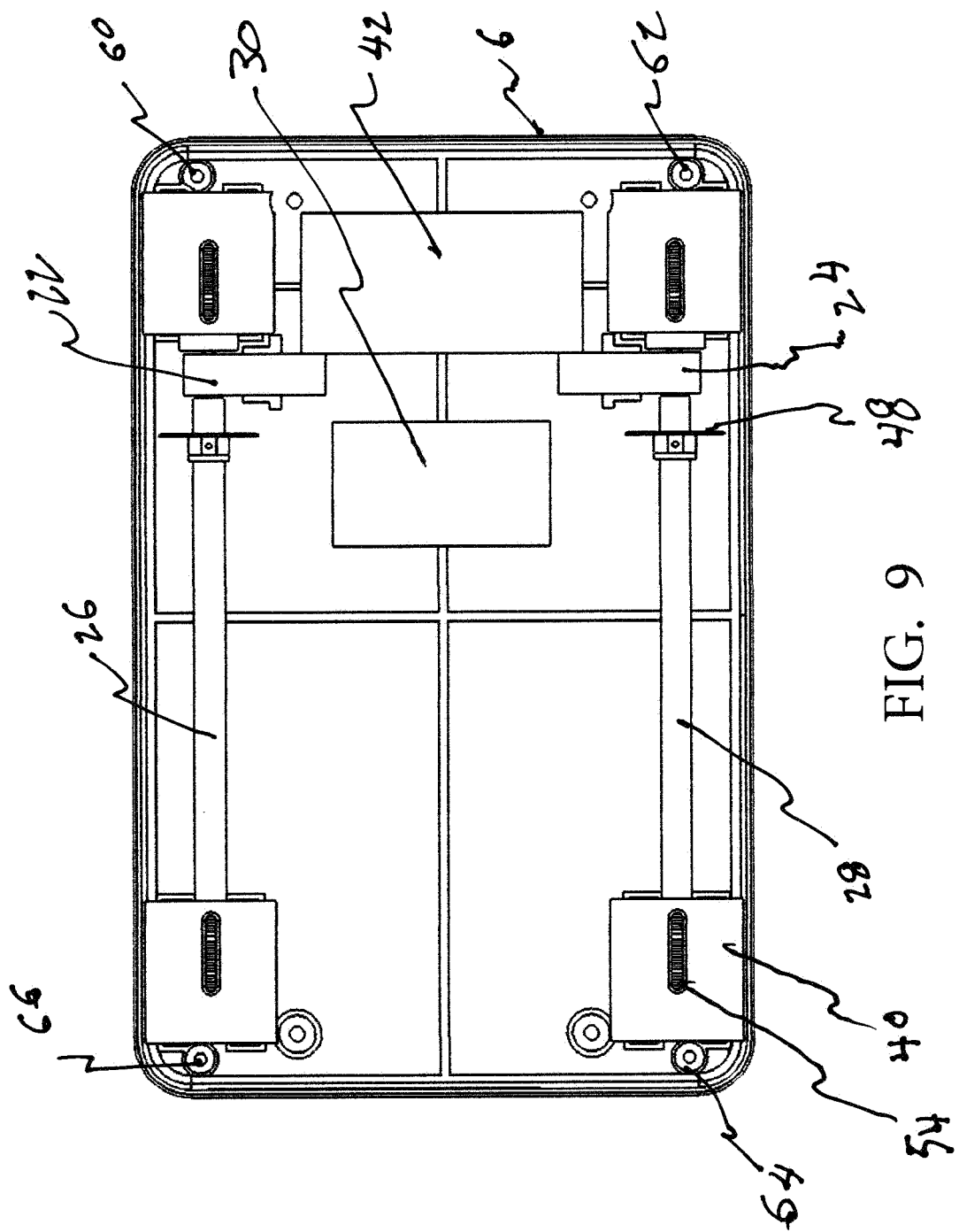
FIG. 9 is a plan view of the main housing with internal components exposed.
Figure 10:
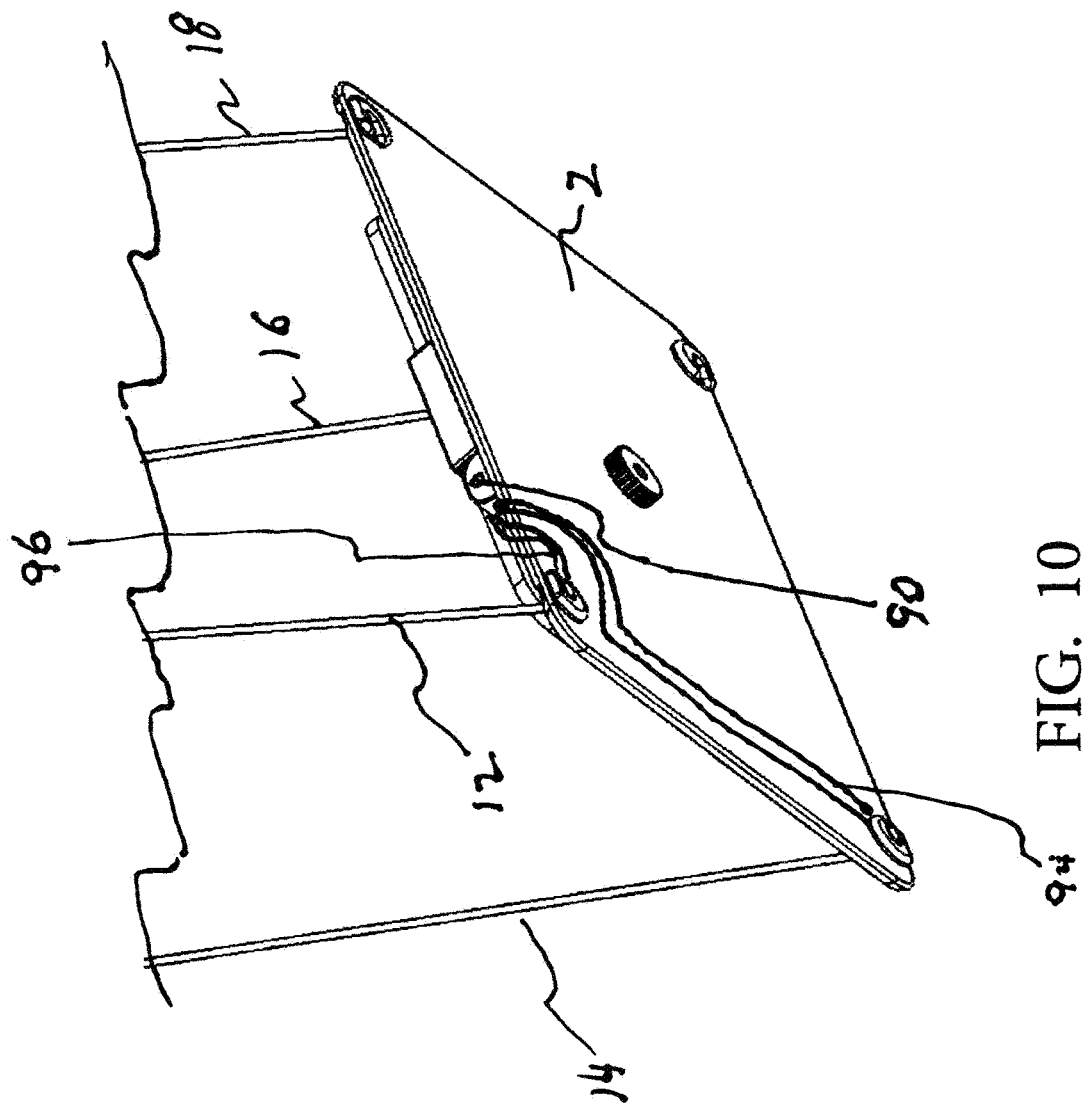
FIG. 10 is a partial perspective view showing the charging port.

FIG. 9 is a plan view with panel 2 removed. Four apertures 60, 62, 64, 66 allow screws to extend through the apertures and be fastened into a ceiling. An electronics assembly 42 includes a microprocessor that helps control the amount of cable that extends from the main housing 6 by counting the number of revolutions of the shaft 28, as well as a receiver circuit that can receive signals from a handheld transmitter, not shown, to command the platform 2 to lower or raise as needed by the user. DC Battery 30 is rechargeable. At least two of the four cables 12, 14, 16, 18 conduct electricity so that the battery 30 can be recharged via a charging port 90 located on platform 2 and shown in FIG. 10 which can be lowered for easy charging rather than having to plug a charging cable into a port located on the main housing located near the ceiling; electrical cables 94, 96 conduct electricity from the charging port 90 cables 14 and 16.

A three-cable embodiment, not shown in drawings, comprises a single pulley disposed near an axial center of the shaft it is mounted on, while the other shaft is as described herein.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

In the claims "upper" defines an entity in the direction higher from the ground, while "lower" defines an entity in the direction closer to the ground. In the claims "right" defines an entity in the direction along the shaft axis in the direction toward the gearmotors from the axial center of the axis. In the claims "left" defines an entity in the direction along the shaft axis in the direction away from the gearmotors toward the axial center of the axis.

In the claims the term "gear motor" is equivalent to "gearmotor", as both terms are used interchangeably by those knowledgeable in the art of making and using gearmotors.

In the claims, the word 'comprising' does not exclude the presence of other elements or steps then those listed in a claim. Furthermore, the terms "a" or "an," as used herein, are defined as "one, or more than one." Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are arbitrarily used to distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

What is claimed is:

1. A personal electronic device holder assembly comprising:
   a. a housing fixedly attached to a ceiling of a room;
      i. a lowering and retracting mechanism comprised of a plurality of gearmotors, a plurality of pulleys, and a plurality of cables;

ii. a power storage and power delivery system; and
iii. a control and communication system;

b. a movable portion wherein the movable portion can be lowered from and retracted into the housing fixedly attached to the ceiling comprising a personal electronic device holding platform having a center, an upper surface and a lower surface;

the personal electronic device holding platform further having an essentially rectangular perimeter comprised of four edges, comprising four approximately symmetrically disposed corners, the platform configured to hold a personal electronic device attached to the platform's upper surface via a manually expandable and spring actuated self-contracting mechanism attached to the rectangular platform, the expandability and self-contracting assembly making it possible to accommodate personal electronic devices of various sizes, wherein furthermore the expandable self-contracting assembly being attached to the platform's upper surface via a threaded stud extending to the platform's lower surface through an aperture disposed essentially in the center of the platform, the expandable self-contracting assembly secured by a nut threaded onto the said stud.

2. The personal electronic device holder assembly of claim 1, wherein the lowering and retracting mechanism comprises:

at least two said gearmotors, each gearmotor having a right shaft and a left shaft driven by said gearmotor, the right shaft axially extending on the right side of the gearmotor the left shaft axially extending on the left side of the gearmotor; and at least four said pulleys, one pulley disposed on each gearmotor shaft, each pulley windingly containing said cables, each cable having a first end and a second end, the first end being attached to the pulley and the second end attached to the device holding platform, each of the cables having a length at least equal to a distance from the ceiling to a user confined to a bed, each second end of the cables attached near one of the device holding platform corners without any of the cables crossing another cable, wherein furthermore each pulley comprises a cover enclosing the said pulley preventing the cable wound onto the pulley from escaping said pulley except through a slit in each pulley cover, wherein furthermore two of the cables are electric current conducting cables.

3. The personal electronic device holder assembly of claim 1, wherein the power storage and delivery system comprises:

a charging port disposed on the device holding platform; electric conductors disposed on the device holding platform surface carrying electric current to the electric current conducting cables; rotary electrical connectors delivering electric power from the electric current conducting cables to a rechargeable battery, the rotary electrical connectors disposed in a hollow of the pulley containing the electric current conducting power cable.

4. The personal electronic device holder assembly of claim 1, wherein the control and communication system comprises:

handheld transmitter adapted to be held and operated by a user and a corresponding wireless receiver disposed in the housing, wherein:

transmitting a lower or a raise command to the wireless receiver from the handheld transmitter;

a microprocessor based electronic control system converting raise and lower commands to control motion of the gearmotors;

the gearmotors motion causing the platform attached cables to wind onto the pulley the cable is disposed on or to unwind from the pulley the cable is disposed on;

transmitting the lower or the raise command by a desired length to the wireless transmitter;

the microprocessor based electronic control system converting the raise and the lower length commands to control motion of the gearmotors by a number of revolutions computed by the microprocessor;

an encoder disk assembly disposed on a left shaft of each gearmotor, sensing the gearmotor rotational motion wherein the signal is converted by the microprocessor into number of rotations; and wherein at least one of the two gearmotors is controllable independently of the other gearmotor.

5. The personal electronic device holder assembly of claim of claim 1, wherein the lowering and retracting mechanism comprises a first said gearmotor and a second said gearmotor, each gearmotor having a right shaft and a left shaft driven by said gearmotor, the right shaft axially extending on a right side of the gearmotor the left shaft axially extending on the left side of the gearmotor; and three pulleys, two pulleys disposed on the first gearmotor shaft and the third pulley disposed in approximate axial center of the second shaft, each pulley windingly containing cables, each cable having a first end and a second end, the first end being attached to the pulley and the second end attached to the device holding platform, each of the cables having a length at least equal to a distance from the ceiling to a bed, each second end of the cables attached near one of the device holding platform corners without any of the cables crossing another cable, wherein furthermore each pulley comprises a cover enclosing the said pulley preventing the cable wound onto the pulley from escaping said pulley except through a slit in each pulley cover, wherein furthermore two of the cables are electric current conducting cables.

* * * * *